United States Patent [19]

Leavitt et al.

[11] Patent Number: 4,680,181
[45] Date of Patent: Jul. 14, 1987

[54] CHEESE PRODUCT AND METHOD OF MANUFACTURE

[75] Inventors: Michael Leavitt, Hamilton; David S. Huls, Corvallis, both of Mont.

[73] Assignee: Hamilton House Marketing, Inc., Missoula, Mont.

[21] Appl. No.: 816,682

[22] Filed: Jan. 3, 1986

Related U.S. Application Data

[63] Continuation of Ser. No. 575,821, Feb. 1, 1984, abandoned.

[51] Int. Cl.⁴ .............................................. A23C 19/02
[52] U.S. Cl. ...................................... 426/36; 426/491; 426/582
[58] Field of Search ................ 426/36, 491, 478, 495, 426/518, 519, 582, 40

[56] References Cited

U.S. PATENT DOCUMENTS 2,505,984  5/1950  Miollis ................................. 426/582
4,234,615  11/1980  Kruegar ............................... 426/582
4,298,618  11/1980  Peterson ................................ 426/36

OTHER PUBLICATIONS

Prescott et al. Industrial Micro; 4th Ed., AVI Publ. Co., p. 70.

Primary Examiner—Raymond N. Jones
Assistant Examiner—Marianne M. Cintins
Attorney, Agent, or Firm—Wells, St. John & Roberts

[57] ABSTRACT

A unique cheese results from combining milled curds typical of cheddar cheese and stirred curds typical of a soft cheese, such as mozzarella. The curds from two cheese vats are combined by pumping a liquid mixture of the stirred curd and whey over a drained loose mass of milled curds. The consolidated curds are then stirred together and salted to simultaneously terminate their fermentation processes. The blended curd mass is molded, pressed and aged similar to cheddar cheese. The resulting cheese has a unique flavor, resembling that of cheddar cheese, and a unique consistency, resembling that of its stirred curd cheese component. A specific example is a mixture containing discrete zones of 60% whole milk cheddar cheese and 40% part skim mozzarella cheese, by volume.

13 Claims, 1 Drawing Figure

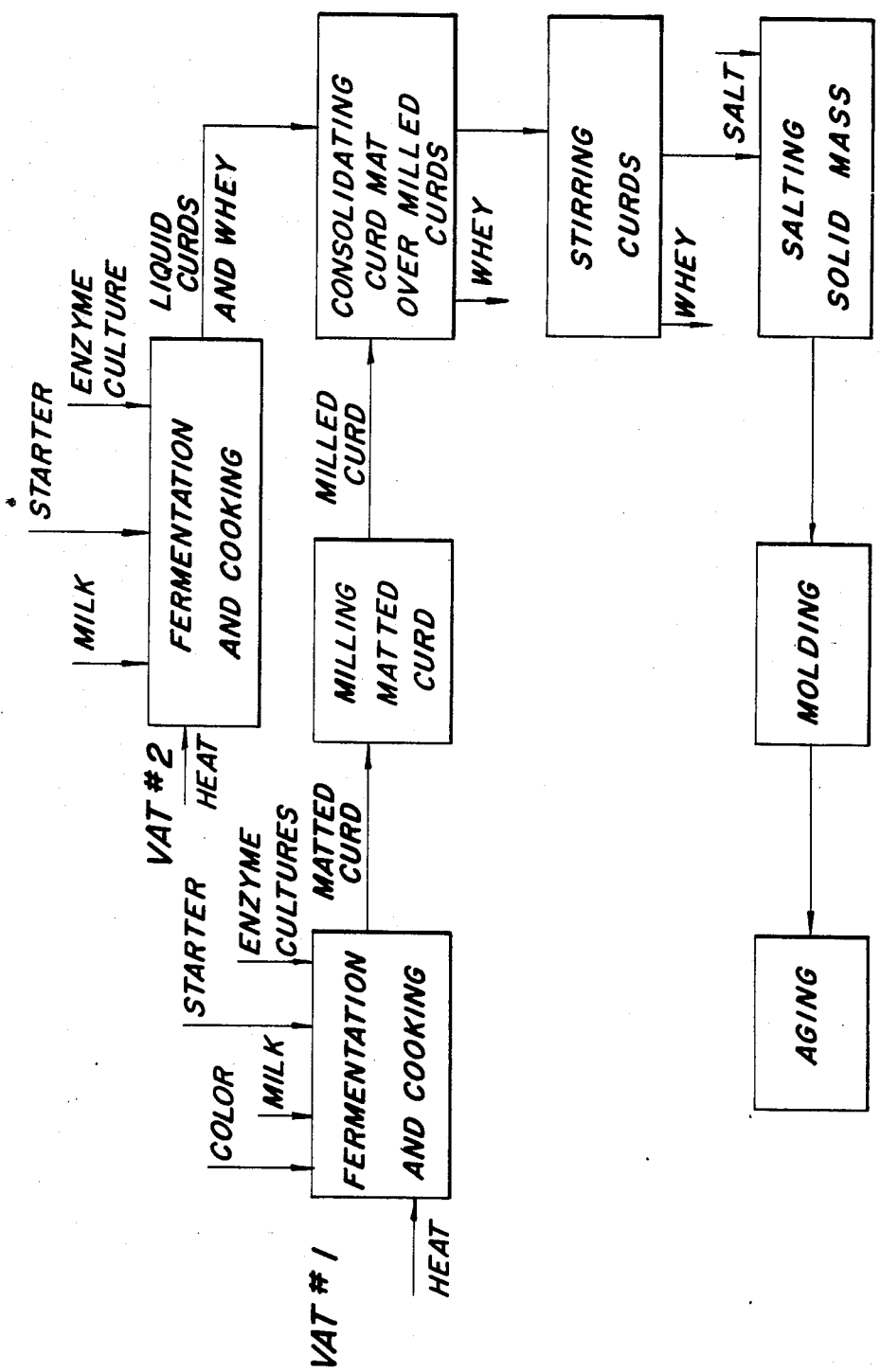

CHEESE PRODUCT AND METHOD OF MANUFACTURE

This is a continuation of application Ser. No. 575,821 filed Feb. 1, 1984, now abandoned.

FIELD OF THE INVENTION

This disclosure relates to a novel cheese, and to a novel process by which the cheese is produced. The novel cheese combines a blend of milled curd cheese with a matrix of stirred curd cheese.

BACKGROUND OF THE INVENTION

This invention arose from a chance combination of two distinct types of cheese during their separate manufacture by conventional processes. The resulting blend of the two cheeses was discovered to produce a novel cheese having its own unique taste and consistency characteristics. These characteristics were not expected or anticipated, based on existing knowledge of the normal characteristics of the cheeses typically produced from the curds used within it.

There are a number of currently available cheese products which include discrete zones having contrasting or complementary cheese characteristics. The discrete zones within such cheese products typically have contrasting colors, which present a desirable visual effect.

Cheese produced with discrete zones of differing cheese characteristics have, to the best of the knowledge of the inventors, always comprised blends of cheese curds produced by similar cheese processes. For example, such a cheese might be produced from two different types of cheddared or milled curds. Alternately, cheeses have been produced by blending two distinct forms of stirred curds. The inventors are unaware of any prior method for combining dissimilar cheeses, such as a milled curd cheese and a stirred curd cheese.

A specific example of a method for making cheese having discrete zones of different characteristics is disclosed in U.S. Pat. No. 4,298,618 to Peterson, issued Nov. 3, 1981. The disclosed method relates to a single vat process, in which two distinguishable masses of stirred curd are produced at opposite sides of a partition. The settled and stirred curds are subsequently mixed with one another, salted, formed, pressed and packaged. Because the curd to one side of the partition is colored differently from that to the remaining side, the resulting cheese has discrete zones of contrasting colors, as well as a mixing of two cheese components with differing taste characteristics.

Where blended cheese products are produced from two types of milled curds or from two types of cut stirred curds, it has been found difficult to handle and store the cheese so as to insure that the discrete particles of the two cheese components will not crumble or separate when cut. Since the curd pieces are simply united by pressure, they often are readily separated by the cutting pressure encountered while drawing a knife or wire through the cheese when serving it. The curd pieces are typically not thoroughly knitted to one another. This tendency to crumble when cut is also inherent in all cheddared cheese, which is produced by first milling discrete curd pieces and the subsequently pressing them in a semi-dry stage.

BRIEF DESCRIPTION OF THE DRAWING

The drawing shows a schematic flow diagram of the process for manufacturing the cheese.

DESCRIPTION OF A PREFERRED EMBODIMENT

In compliance with the constitutional purpose of the Patent Laws "to promote the progress of science and useful arts" (Article 1, Section 8), applicant submits the following disclosure of the invention.

A new cheese having discrete zones of a milled curd cheese and a stirred curd cheese which are uniformly mixed and knitted into an integral mass is produced from conventional discrete pieces of milled cheese curds and an interposed matrix of conventional stirred cheese curds. The resulting cheese product exhibits unique characteristics not directly attributable to the individual cheeses which would normally be produced by use of the curds incorporated within it. The distinct zones of differing cheese elements are finely knit together. The cheese has no tendency to separate along the distinct boundaries that define these zones. Cheese made from a blend of whole milk cheddar and part skim mozzarella has been found to exhibit a smooth texture that is uniform throughout its volume. It has a distinctive, slightly sweet taste, and a uniform consistency which is softer than that of normal cheddar cheese and harder than that of normal mozzarella cheese. Most importantly, it ages well and has a flavor that matures in a predicable manner. It is well known that stirred curd cheeses, such as mozzarella, have a relatively short shelf life during which their flavor and consistency deteriorate to unusable states. While aging of cheddar cheese is also predictable, a substantial content of mozzarella cheese in the final blend would not be expected to exhibit such aging capabilities.

The solid cheese that results from this method includes a matrix of a stirred curd cheese (such as mozzarella) and a plurality of discrete zones of a milled curd cheese (such as cheddar) dispersed throughout and knitted to the matrix. After aging a minimum of at least 10 to 15 days under the usual aging environmental conditions used in the production of cheddar cheese, the novel cheese exhibits both a slightly sweet flavor that somewhat resembles that of cheddar cheese and a consistency for eating and cooking purposes resembling that of a firm mozzarella cheese.

The present method essentially utilizes conventional production techniques for both the milled curd cheese and the stirred curd cheese. The production of the distinctive cheese curd must be carried out in synchronism in two different vats. The novel steps of the method relate to the unique manner by which these two different cheese curds are combined to produce a new and unexpected cheese product.

The drawing schematically illustrates the production steps involved in making this cheese. From a time viewpoint, the production of the milled curd must be initiated prior to the production of the stirred curd. The milling steps require additional processing time not necessary in the production of a stirred curd. Assuming a total production time of about seven hours in the milled curd process, the stirred curd production would start approximately one hour after initiation of the milled curd production.

In this description, the cheese vat used in the production of the milled curd shall be arbitrarily identified as the "first vat" or "vat #1". The cheese vat used in production of the stirred curd shall be identified as the "second vat" or "vat #2". These arbitrary designations have been chosen to assist in distinguishing the processing equipment for purposes of this discussion.

A volume of fresh pasteurized whole milk is introduced into the first vat, and heated while an active lactic starter is added. A coloring agent is also added to provide visual contrast in the final product. The fermentation treatment within the first vat should include the introduction of known materials required to produce a cheese of the selected characteristics, such as whole milk cheddar cheese. Any known fermentation method of treating the milk so as to produce such characteristics might be used.

After the milk has been ripened, the cheese is set by addition of a setting agent, such as rennet. After thorough mixing, agitation is terminated.

After the curd has formed and settled in the first vat, it is cut in the conventional manner and stirred into the whey for cooking purposes. The curds and whey are typically agitated throughout the normal cooking and holding period.

After the curd has been cooked, agitation is again terminated and the curds are allowed to settle in the first vat. The whey is drained from the first vat. The matted curd is then fed through a milling machine and allowed to drop back into the vat as a loose mass of discrete milled curd pieces.

As mentioned previously, preparation of the stirred curd cheese in the second vat is initated at a time later than initation of the steps required to produce the milled curd in the first vat. The two vats must be synchronized so as to produce the stirred curd within the second vat simultaneously with the completion of the milling of the curd in the first vat.

The steps involved in the fermentation and cooking of the milk in the second vat are similar to those described with respect to treatment of the milk in the first vat. The materials introduced into the second vat for fermentation purposes will be chosen to produce a cheese curd having different characteristics from that produced in the first vat. The curds and whey in the second vat are maintained in a liquid mixture and not permitted to settle. The liquid mixture is then pumped over the mass of milled curd pieces in the first vat and the stirred curd is allowed to settle as a semi-solid mat over the milled curd. The whey from the second vat is allowed to drain through this consolidated mass of milled curd and stirred curd.

The consolidated mass of the two curds are stirred in the first vat as all remaining whey is finally drained from the vat. This stirring step produces a curd mass containing discrete milled curd pieces within a matrix of the stirred curd from the second vat. The mixed curd mass is then salted while stirring continues, using conventional salting techniques. The salted curd mass is then molded in hoops or boxes and subjected to the required pressure necessary to reduce it to its desired final density.

The blended curd mass is then ripened in the same manner as is typical with respect to cheddar cheese. This involves aging under controlled environmental conditions to produce various degrees of "sharp" flavor in the marketed cheese product.

The production of the two cheese curds does not deviate from standard cheese practice other than in the step by which they are consolidated. This is a critical step, in that it has been found to assure firm knitting of the two dissimilar cheese components in the final blended product. The whey from the second vat is permitted to flow through the mass of milled curds in the first vat prior to mixing the two dissimilar curds into a final mass. The draining of the whey through the milled curds, the prompt stirring of the dissimilar curds, and the final salting and molding of the two curds in a single mass are all steps which contribute to the integral knitting of the discrete cheese zones in the final product. The resulting cheese shows no tendency to separate along the boundary lines that distinguish the differing zones of cheese curds. In fact, the cheese has no more tendency to separate along these boundaries than through the midsection of such zones. The final cheese has a very homogenous texture throughout the differing cheese zones. Furthermore, it ages well and shows no taste deviations from one cheese zone to another. The final cheese combines a milled curd cheese taste with a stirred curd cheese texture. It has desirable characteristics for both cooking and eating purposes.

EXAMPLE

A first cheese vat was first filled with pasteurized milk, standardized to a butterfat content of 3.5 to 3.8% and adjusted to a setting temperature of 88° F. An active lactic starter (such as Marschall Superstart, sold by Marschall Division, Miles Laboratories, Inc.) was added while mixing the milk, along with a desired concentration of cheese color. The bacterial culture in the starter was allowed to reproduce during fermentation until the milk had been brought to a desired acidic level. The milk in the first vat was then set by addition of a measured amount of Marzyme (also produced by Marschall), or a rennet extract, premixed with tap water for introduction. The milk was stirred briefly and then allowed to settle for curd formation.

The curd in the first vat was cut with curd knives into cube shaped curd pieces, typically one quarter inch or more to the side. At this point, the titratable acidity in the vat is approximately 0.10. The whey and curd in the first vat were then agitated during cooking to a peak temperature of about 100° F. The whey was then drained from the first vat and the acid readings were at about 0.14. The curds were then cheddared in the usual manner. The curds were packed and cut into slabs. During the next hour the slabs were turned and stacked until the titratable acidity readings reached 0.30 to 0.33. The curd slabs were then fed into a milling machine suspended over the first vat. The milled curds were permitted to drop back into the first vat.

Approximately one hour after adding milk to the first vat, milk was added to the second vat to produce a stirred curd mozzarella. Since the mozzarella was a part skim cheese, the pasteurized milk in the second vat was standardized to 2.5% butterfat. It was then heated to 88° F. The starter culture (Marschall Superstart) was then added and the materials in the second vat were ripened for one and one quarter hour. The milk was set by addition of a 1.5% solution of Marzyme. The settled curd was cut into small cubes while at a titratable acidity of 0.10 to 0.105.

The cut curd was allowed to sit 10 minutes before stirring. Fifteen minutes after cutting, steam was introduced into the jacket surrounding the second vat to cook the curds and whey to a temperature of 100° F. This took 25 to 30 minutes. The whey was predrawn immediately after the temperature is reached. Cooking was continued until the acidic level of the whey in the second vat reached a titratable acidity of at least 0.145 to 0.15 before cooling. The normal time from the time the cooking temperature was reached to the time that cooling was initiated was one hour. During this period, the material in the second vat was constantly stirred to prevent the formation of lumps.

The material in the second vat was then cooled to a temperature of between 84° F. and 90° F., while continuing to stir it and maintaining a liquid mixture of curds and whey without lumps. The cooling step must be timed so that its completion coincides with completion of the milling of the cheese curd in the first vat.

The liquid mixture of curds and whey from the second vat was then pumped over the loose mass of milled curds deposited in the first vat. The whey from the second vat drained through the loose mass of milled curds, thoroughly wetting their surfaces in the process. The consolidated curds from the two vats were then mixed thoroughly, without breaking up the milled curds. This resulted in a mixture of milled curds and stirred curds, with the stirred curds creating a matrix containing the discrete pieces of milled curds. The mixture was salted in the conventional manner, applying the salt in three portions. It was then placed in hoops and pressed in the manner typically used in the production of cheddar cheese. The pressed cheese was then ripened by aging it under controlled environmental conditions typical in the production and aging of cheddar cheese.

Various proportions of the cheese components have been produced with satisfactory results. Tests have been conducted to date with cheddar and mozzarella cheese blends containing between ⅓ to ⅔ milled cheese (cheddar), by volume in the final solid cheese product. All have been satisfactory as physical blends. One combination of whole milk cheddar cheese and part skim mozzarella cheese that has been found to exhibit optimum taste and consistency characteristics includes both cheddar and mozzarella cheese components in proportions of 60% cheddar and 40% mozzarella, by volume.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A method for making a resultant cheese having discrete cheddared curd pieces within a matrix of stirred curds in which the resultant cheese does not have a tendency to separate along distinct boundaries that define zones, and has a flavor distinct from those of its component curds and the ability to age without the resulting deterioration of flavor and consistency common to stirred curd cheese, comprising the following steps:
   (a) treating a first quantity of milk with a starter to ripen the milk;
   (b) treating the ripened first quantity of milk with a coagulating agent to form a first coagulated mass of a first curd and a first whey;
   (c) cutting the first coagulated mass to facilitate the separation of the whey from the curd;
   (d) heating and stirring the cut mass to further facilitate the separation of the whey from the curd;
   (e) removing the whey leaving a resultant curd;
   (f) cheddaring the resultant curd to elongate the resultant curd and reduce the moisture content and increase the acidity of the resultant curd to form firm, discrete cheddared curd pieces;
   (g) treating a second quantity of milk with a starter to ripen the milk;
   (h) treating the ripened second quantity of milk with a coagulating agent to form a second coagulated mass of a curd and a whey;
   (i) cutting the second coagulated mass to facilitate the separation of the whey from the curd;
   (j) heating and stirring the cut second mass separate and apart from the first mass to facilitate the separation of the whey from the curd and form a heated fluid mass of stirred curd and stirred curd whey;
   (k) intermixing the heated fluid mass of stirred curd and stirred curd whey with the firm, discrete cheddared curd pieces;
   (l) removing the stirred curd whey from the intermixed stirred curd and the firm, large, discrete cheddared curd pieces to form an integral solid cheese mass containing discrete cheddared curd pieces within a matrix of the stirred curd;
   (m) salting both the stirred curd and cheddared curd pieces while they are being intermixed and prior to formation of the integral cheese mass; and
   (n) placing the integral solid cheese mass into a container and pressing the integral solid cheese mass to its desired final density to form the resultant cheese.

2. The method of claim 1, further comprising the following step of ripening the integral solid cheese mass by aging it under controlled environmental conditions.

3. The method of claim 1 wherein the integral cheese mass comprises approximately 60% cheddared curd pieces and 40% stirred curd, by volume.

4. The method of claim 1 wherein the intermixing of the heated fluid mass of stirred curd and whey with the firm, discrete, cheddared curd pieces and the removing of the stirred curd whey is accomplished by:
   (a) directing the heated fluid mass of stirred curd and whey onto the firm, discrete cheddared curd pieces;
   (b) permitting the stirred curd whey to drain through and from the large discrete cheddared curd pieces;
   (c) stirring the remaining firm, discrete cheddared curd pieces and stirred curd to uniformly mix them and to produce the integral solid cheese mass.

5. The method as defined in claim 4 wherein the salting is accomplished by adding salt while the firm, discrete cheddared curd pieces and stirred curd are being stirred.

6. The product produced by the method of claim 1.

7. The product produced by the method of claim 2.

8. The product produced by the method of claim 4.

9. A method for making cheese having discrete zones of cheese produced from (1) curds which have been cheddared and milled and (2) stirred curds knitted into an integral solid cheese mass having no tendency to separate along distinct boundaries that define the discrete zones, with a flavor distinct from those of its component curds and the ability to age without the resulting deterioration of flavor and consistency common to stirred curd cheese, comprising the following steps:

(a) treating a first quantity of milk in a first vat with a starter to ripen the milk;

(b) treating the ripened milk in the first vat with a coagulating agent to form a first coagulated mass of curd and whey;

(c) removing the whey from the first coagulated mass to form a curd matt;

(d) cheddaring and milling the curd matt to elongate the curd, reduce the curd moisture content and increase the acidity of the curd and to form firm, discrete cheddared and milled curd pieces;

(e) treating a second quantity of milk in a second vat with a starter to ripen the milk in the second vat;

(f) treating the ripened milk in the second vat with a coagulating agent to form a second coagulated mass of curd and whey;

(g) heating and stirring the second coagulated mass in the second vat to form a heated fluid mass of stirred curd and stirred curd whey;

(h) removing the treated fluid mass from the second vat and intermixing the heated fluid mass of stirred curd and stirred curd whey with the discrete cheddared and milled curd pieces while permitting the stirred curd whey to drain therefrom to form the integral solid cheese mass containing discrete cheddared and milled curd pieces within a matrix of the stirred curd;

(i) salting the integral solid cheese mass; and (j) placing the integral solid cheese mass in a container and pressing it to its desired final density.

10. The method of claim 9 further comprising the step of ripening the pressed integral solid cheese mass by aging it under controlled environmental conditions.

11. The method as defined in claim 9 wherein the first quantity of milk has a butterfat content greater than the butterfat content of the second quantity of milk.

12. The method of claim 9 wherein the intermixing of the heated fluid mass of stirred curd and whey with the firm cheddared and milled curd pieces and the removing of the stirred curd whey is accomplished by:

(a) directing the heated fluid mass of stirred curd and whey onto the firm, discrete cheddared and milled curd pieces;

(b) permitting the stirred curd whey to drain through and from the firm, discrete cheddared and milled curd pieces;

(c) stirring the remaining firm, discrete cheddared and milled curd pieces and stirred curd to uniformly mix them and to produce the integral solid cheese mass.

13. The product produced by the method of claim 9.

* * * * *